US006810176B2

United States Patent
Frick et al.

(10) Patent No.: US 6,810,176 B2
(45) Date of Patent: Oct. 26, 2004

(54) INTEGRATED TRANSPARENT SUBSTRATE AND DIFFRACTIVE OPTICAL ELEMENT

(75) Inventors: Roger L. Frick, Hackensack, MN (US); Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 48 days.

(21) Appl. No.: 09/905,769

(22) Filed: Jul. 13, 2001

(65) Prior Publication Data

US 2002/0047129 A1 Apr. 25, 2002

Related U.S. Application Data

(60) Provisional application No. 60/271,103, filed on Feb. 23, 2001, provisional application No. 60/223,508, filed on Aug. 7, 2000, and provisional application No. 60/223,503, filed on Aug. 7, 2000.

(51) Int. Cl.[7] .............................................. G02B 6/34
(52) U.S. Cl. .......................................... 385/37; 385/14
(58) Field of Search ..................... 385/14, 37; 359/566, 359/569, 572

(56) References Cited

U.S. PATENT DOCUMENTS

| | | |
|---|---|---|
| 3,514,183 A | 5/1970 | Rabedeau |
| 3,947,630 A | 3/1976 | Javan |
| 4,013,000 A | 3/1977 | Kogelnik |
| 4,111,524 A | 9/1978 | Tomlinson, III |
| 4,115,747 A | 9/1978 | Sato et al. |
| 4,165,155 A | 8/1979 | Gordon, II et al. |
| 4,257,016 A | 3/1981 | Kramer, Jr. et al. |
| 4,303,302 A | 12/1981 | Ramsey et al. |
| 4,356,730 A | 11/1982 | Cade |
| 4,387,955 A | 6/1983 | Ludman et al. |

(List continued on next page.)

FOREIGN PATENT DOCUMENTS

| | | |
|---|---|---|
| EP | 0137851 | 4/1985 |
| EP | 0277779 | 8/1988 |
| EP | 0 322 218 | 6/1989 |
| EP | 0 467 303 | 1/1992 |
| EP | 0279679 | 11/1992 |

(List continued on next page.)

OTHER PUBLICATIONS

International Preliminary Examination Report from PCT/US02/13309.

(List continued on next page.)

Primary Examiner—Drew A. Dunn
Assistant Examiner—Alessandro Amari
(74) Attorney, Agent, or Firm—Marshall, Gerstein & Borun LLP

(57) ABSTRACT

A diffractive optical element (DOE) is shown formed on a substrate. The DOE is characterized, in one embodiment, by being formed from a plurality of members that are each individually created on a top surface of the substrate. The members may be formed by depositing a poly-silicon material on the substrate or by growing a silicon crystal on the substrate and performing an etch step. The substrate may be formed of a sapphire crystal. The DOE may be used to reflect incident light traveling within the substrate under total internal reflection. The widths, spacing between, and heights of the strips forming the DOE may be designed so as to reflect the incident light within the substrate in a direction of propagation acute to that of the incident light.

32 Claims, 8 Drawing Sheets

U.S. PATENT DOCUMENTS

| | | |
|---|---|---|
| 4,498,730 A | 2/1985 | Tanaka et al. |
| 4,571,024 A | 2/1986 | Husbands |
| 4,626,066 A | 12/1986 | Levinson |
| 4,657,339 A | 4/1987 | Fick |
| 4,662,746 A | 5/1987 | Hornbeck |
| 4,674,828 A | 6/1987 | Takahashi et al. |
| 4,705,349 A | 11/1987 | Reedy |
| 4,710,732 A | 12/1987 | Hornbeck |
| 4,715,680 A | 12/1987 | Kawaguchi et al. |
| 4,718,056 A | 1/1988 | Schultheiss |
| 4,753,513 A * | 6/1988 | Shikama ............... 359/566 |
| 4,755,415 A | 7/1988 | Iijima et al. |
| 4,764,889 A | 8/1988 | Hinton et al. |
| 4,815,827 A | 3/1989 | Lane |
| 4,867,532 A | 9/1989 | Stanley |
| 4,904,039 A | 2/1990 | Soref |
| 5,024,500 A | 6/1991 | Stanley et al. |
| 5,029,981 A | 7/1991 | Thompson |
| 5,036,042 A | 7/1991 | Hed |
| 5,040,864 A | 8/1991 | Hong |
| 5,063,418 A | 11/1991 | Shurtz, II et al. |
| 5,083,857 A | 1/1992 | Hornbeck |
| 5,107,359 A | 4/1992 | Ohuchida |
| 5,133,027 A | 7/1992 | Funazaki et al. |
| 5,153,770 A | 10/1992 | Harris |
| 5,155,617 A | 10/1992 | Solgaard et al. |
| 5,155,778 A | 10/1992 | Magel et al. |
| 5,157,756 A | 10/1992 | Nishimoto |
| 5,221,987 A | 6/1993 | Laughlin |
| 5,231,304 A | 7/1993 | Solomon |
| 5,255,332 A | 10/1993 | Welch et al. |
| 5,262,000 A | 11/1993 | Welbourn et al. |
| 5,278,925 A | 1/1994 | Boysel et al. |
| 5,291,566 A | 3/1994 | Harris |
| 5,311,360 A | 5/1994 | Bloom et al. |
| 5,315,676 A | 5/1994 | Sunagawa ............... 385/37 |
| 5,377,288 A | 12/1994 | Kashyap et al. |
| 5,455,709 A | 10/1995 | Dula, III et al. |
| 5,491,762 A | 2/1996 | Deacon et al. |
| 5,500,910 A | 3/1996 | Boudreau et al. |
| 5,532,855 A | 7/1996 | Kato et al. |
| 5,537,617 A | 7/1996 | Zavislan et al. |
| 5,561,558 A * | 10/1996 | Shiono et al. ............ 359/569 |
| 5,661,592 A | 8/1997 | Bornstein et al. |
| 5,661,593 A | 8/1997 | Engle |
| 5,682,255 A | 10/1997 | Friesem et al. |
| 5,748,811 A | 5/1998 | Amersfoort et al. |
| 5,770,855 A | 6/1998 | Fischer |
| 5,771,320 A | 6/1998 | Stone |
| 5,771,321 A | 6/1998 | Stern |
| 5,786,925 A | 7/1998 | Goossen et al. |
| 5,875,271 A | 2/1999 | Laughlin |
| 5,892,598 A * | 4/1999 | Asakawa et al. ........... 359/13 |
| 5,960,133 A | 9/1999 | Tomlinson |
| 5,966,223 A | 10/1999 | Friesem et al. |
| 6,072,923 A | 6/2000 | Stone |
| 6,093,941 A | 7/2000 | Russell et al. |
| 6,169,613 B1 | 1/2001 | Amitai et al. |
| 6,212,314 B1 | 4/2001 | Ford ........................ 385/30 |
| 6,433,911 B1 * | 8/2002 | Chen et al. ............... 359/222 |

FOREIGN PATENT DOCUMENTS

| | | |
|---|---|---|
| EP | 0 609 812 | 8/1994 |
| EP | 0 969 306 | 1/2000 |
| JP | 57-35828 | 2/1982 |
| JP | 57-173814 | 10/1982 |
| JP | 57-173819 | 10/1982 |
| JP | 57-173820 | 10/1982 |
| JP | 59-147322 | 8/1984 |
| JP | 59-176731 | 10/1984 |
| JP | 59-185311 | 10/1984 |
| JP | 59-214020 | 12/1984 |
| JP | 60-22120 | 2/1985 |
| JP | 60-97319 | 5/1985 |
| JP | 60-134219 | 7/1985 |
| JP | 60-190038 | 9/1985 |
| JP | 61-121042 | 6/1986 |
| JP | 61-231522 | 10/1986 |
| JP | 62-49336 | 3/1987 |
| JP | 62-69247 | 3/1987 |
| JP | 62146443 | 6/1987 |
| JP | 4-30130 | 2/1992 |
| JP | 4-287028 | 10/1992 |
| JP | 5-93924 | 4/1993 |
| JP | 5-142587 | 6/1993 |
| JP | 6-95173 | 4/1994 |
| JP | 8-234246 | 9/1996 |
| JP | 10-206910 | 8/1998 |
| JP | 2000-105321 | 4/2000 |
| JP | 2000-221553 | 8/2000 |
| WO | WO 00/02098 | 1/2000 |
| WO | WO 01/42825 | 6/2001 |

OTHER PUBLICATIONS

Chan, "Compact Disc Pickup Designs" Jul. 18, 2000.
Jahns, et al. "Planar Integration of Free–Space Optical Components," *Applied Optics* 28(9):1602–1605 (1989).
Krygowski et al. "Development of a Co mpact Optical–MEMS Scanner with Integrated VCSEL Light Source and Diffractive Optics," *SPIE* 3878:20–28 (1999).
Krygowski et al. "Integrated Microsystems" *Proc. Of SPIE* 3878:20–28 (1999).
Wendt, et al. "Fabricati on of diffractive optical elements for an integrated compact optical microelectromechanical system laser scanner," *J. Vac. Sci. Technol.* 18(6):3608–3611 (2000).
International Search Report from PCT/US02/13343.
Völkel, et al. "Optical backplane for a broadband switching system," *Electronics Letters* 31(3):234–235 (1995).
International Search Report from PCT/US02/13309.

\* cited by examiner

INTEGRATED TRANSPARENT SUBSTRATE AND DIFFRACTIVE OPTICAL ELEMENT

CROSS-REFERENCE TO RELATED APPLICATIONS

This application claims the benefit of U.S. Provisional Application No. 60/223,503, filed Aug. 7, 2000, U.S. Provisional Application No. 60/223,508 filed Aug. 7, 2000, and U.S. Provisional Application No. 60/271,103 filed Feb. 23, 2001.

FIELD OF THE INVENTION

The present invention relates generally to integrated optical circuits and more specifically integrated optical circuits based on diffractive optical elements mounted on a transparent optical substrate.

BACKGROUND OF THE PRIOR ART

It has been proposed that integrated optical circuits could be constructed by mounting reflective planar optical elements on a transparent substrate and coupling the elements by means of internal reflections from the mirrored surface of a transparent substrate. The planar optical elements would direct, focus or otherwise diffract an incident optical signal in a desired manner. This approach would allow complex optical devices to be constructed and interconnected in a planar fashion similar to electrical integrated circuits.

This approach has had limited success because of inherent reflection losses and the difficulty of constructing planar elements that are efficiently coupled to the internal optical signal. Mirrored surfaces of the substrate are commonly constructed by applying a thin film of metal to a transparent substrate, but known thin film materials have losses of several percent, and the signal strength is lost exponentially if multiple reflections are necessary. Further, if the planar optical elements are not in intimate contact with the substrate surface there can be large losses associated with getting the optical signal out of and back into the substrate.

Diffractive optical elements (DOEs) are ideally suited for the reflective planar optical elements since they can be integral with the surface, but they suffer from several deficiencies. They typically require a metallic coating to operate in the reflective mode and this results in the loss of optical signal. If the dimensions of the diffracting objects in the DOE are much larger than the wavelength of light in the substrate they will diffract the light into modes other than the desired mode, which can result in a loss of efficiency and cause undesirable errors such as crosstalk. This problem can be somewhat minimized by using blazed grating patterns in which the objects are shaped to preferentially diffract light in a desired direction. A sawtooth blazed diffraction grating is an example, typically fabricated using a shaped engraving tool. Nevertheless, the three dimensional nature of blazed gratings makes them difficult to fabricate on the surface of an optical substrate, however, diffraction of light into undesired modes and directions is still a problem.

If the dimensions of the diffracting objects approach the wavelength of light, the undesired modes or directions can be minimized or eliminated by the proper selection of incident angles and size of the diffracting objects. Such a device is generally known as a holographic optical element (HOE), which is a subset of DOEs. If these devices are constructed by means of patterning the depth of a reflective surface they are known as surface relief or phase holograms since the different depths of the diffracting surface cause varying phase shifts in the diffracted light. These phase shifts can be adjusted to cause constructive interference of light in the desired direction or mode of the directed light signal by adjusting the depth of the pattern. If the pattern of refracting objects is coated with a reflecting metal film, losses could be as low as a few percent since very little of the light energy is absorbed in such a device. In practice, however, it is difficult to construct such a device on the surface of a substrate in a manner that exhibits high efficiency and can be efficiently manufactured. Electron beams can directly write patterns of these dimensions onto a substrate but this is a very slow and expensive process and does not lend itself to producing the surface relief required for a phase type hologram. Embossing is used to reproduce surface type holograms on transparent plastics (e.g. credit card security holograms) but the tolerances and stability of these materials are not suitable for most applications.

On the other hand, volume holograms can also be created by exposing a photographic emulsion to a pattern of interfering laser light. A pattern of diffracting objects is created within the volume of the emulsion. HOEs constructed with this method can have high efficiency, but they are notoriously difficult to produce and are subject to deterioration due to environmental effects.

As would be evident from the above problems, there is a need for a method of forming an optical integrated circuit based on diffractive optical elements on the surface of a transparent substrate with high optical efficiency that can be mass-produced at a relatively affordable cost.

SUMMARY OF THE INVENTION

In one embodiment, provided is an integrated optical device having an optical substrate, wherein an incident light signal is propagating within the substrate in a primary direction of propagation reflecting off a top surface of the substrate under total internal reflection. The integrated optical device also has a diffractive optical element having a plurality of spaced-apart members formed of an optically transparent material and that are disposed above the top surface of the substrate such that the incident light signal is reflected within the substrate along a desired direction of propagation.

In accordance with an even further embodiment, provided is a diffraction grating for use with an optically transparent substrate and having a plurality of members formed of a second optically transparent material and disposed on a top surface of the substrate. The members are spaced apart a spacing distance and have member widths. The sum of the spacing distance and the member width is chosen such that a light signal traveling within the substrate under total internal reflection off the top surface in an incident direction of propagation and incident upon the diffraction grating is reflected into a first diffracted order propagating within the substrate in a reflected direction of propagation. The reflected direction of propagation defines an angle with respect to the incident direction of propagation and the reflected light signal is propagating within the substrate under total internal reflection.

In accordance with another embodiment, provided is a method of routing an incident light signal. The method includes a step of transmitting the incident light signal in an optical substrate under total internal reflection off of a top surface of the substrate. Performed in another step of the method is a step of disposing a plurality of spaced-apart strips above the top surface of the substrate for receiving a portion of the incident light signal. The strips are disposed such that the strips form a diffraction grating that reflects the incident light into a first diffracted order propagating within the substrate in a reflected direction of propagation defining an angle with respect to an incident direction of propagation and propagating within the substrate under total internal reflection.

In accordance with another embodiment, provided is an integrated optical device having a substrate formed of an optically transparent material and having a light signal traveling within the substrate under total internal reflection. The integrated optical device also has a first diffractive optical element formed of a first plurality of spaced-apart members disposed above a top surface of the substrate so as to reflect the light signal within the substrate in a desired direction of propagation. Furthermore, the integrated optical device has a second diffractive optical element formed of a second plurality of spaced-apart members and disposed above the top surface of the substrate to receive the reflected light signal from the first diffractive optical element and disposed to output the reflected light signal for propagation within the substrate.

DESCRIPTION OF THE PREFERRED EMBODIMENTS

The presently disclosed embodiments solve the above-described problems by providing an optical device incorporating diffractive optical elements positioned on a transparent substrate that can be fabricated with standard MEMS materials and fabrication techniques. With the disclosed teachings, numerous optical elements can be formed including diffractive elements reflecting incident light. The preferred embodiments below illustrate a diffractive optical element in the form of a HOE that forms a virtual mirror, which may be used in conjunction with an optical substrate. None of the embodiments provided requires a reflective coating. Nevertheless, non-HOE diffractive optical elements could be used.

In lieu of reflective coatings the HOE and substrate hereinbelow are adapted to affect light traveling within an optical substrate under total internal reflection. Total internal reflection (TIR) is a very low loss optical phenomenon, leading to high efficiency operation in the disclosed devices. The diffracting objects in the HOE itself preferably diffract light by means of total internal reflection to minimize losses. In addition, the depicted HOEs are designed to only allow one diffracted mode to exist, which further reduces losses. The HOEs are preferably constructed as phase holograms that suppress the reflected m=0 mode thus allowing overall efficiency to approach 100%. The HOEs cooperate with the optical substrate to reflect an incident light traveling therein such that the reflected light also propagates within the substrate under TIR, which allows many HOEs to be optically connected with a high overall device efficiency.

While diffractive optical elements such as these generally described above are shown, it would be understood that the present disclosure provides more broadly for a system of building optical devices and that the optical devices that may be built are many. In fact, the present disclosure shows a series of integrated substrate and diffractive optical element components, or devices. These integrated components can form many optical devices such as reflectors, collimators, diffraction gratings, beam splitters and variable attenuators. The integrated substrate and diffractive optical element could also function as a converging or diverging lens. As the descriptions below indicate, the disclosures provide a way of reproducing hologram patterns that could serve numerous functions.

Figure 1:
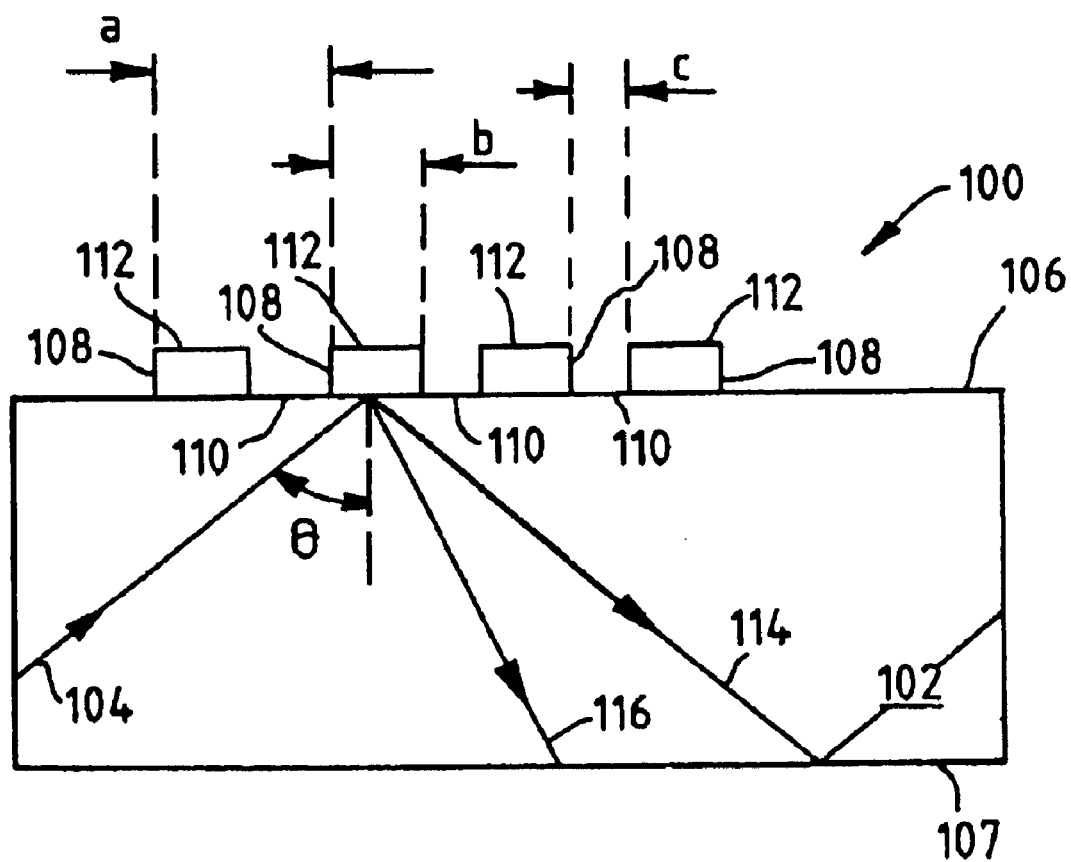
FIG. 1 is a cross-sectional illustration of a holographic optical element in accordance with an embodiment.

FIG. 1 shows a cross-sectional side view of an HOE 100 and an optical substrate material, which in the preferred embodiment is optically transparent. More specifically, the substrate 102 should be optically transparent in the infrared region such as the C band used for wavelength division multiplexed (WDM) infrared optical long distance communication. This band encompasses wavelengths from 1528 nm to 1621 nm nanometers but operation in other optical communications bands is also envisioned. The substrate 102 may be made of various materials such as sapphire or quartz or another substrate material suitable for propagating a light signal under TIR and for serving as an etch-stop for a photolithography process, as explained in more detail below.

An incident light beam 104 is traveling through the substrate 102 under total internal reflection, which as would be known occurs above a critical angle of incidence at the outer surface boundary of the substrate 102. In the preferred embodiment, the substrate 102 has a top surface 106 above, which is disposed air. The index of refraction of the substrate and the index of refraction of air define the critical angle for total internal reflection within the substrate.

An angle of incidence, $\theta$, is shown in FIG. 1 measured from a normal to the top surface 106 and extending into the substrate 102. For a sapphire substrate 102 surrounded by an air boundary, the critical angle is approximately 35°, and so $\theta$ is to be at or above this value for TIR propagation. That is, the light beam 104 can be made incident upon the top surface 106 at angles above the critical angle and still facilitate HOE 100 operation. While in the preferred embodiment, air is disposed above the top surface 106, other materials may be disposed above the substrate 102 so long as these materials have an index of refraction less than that of the substrate 102 to establish the TIR conditions. Further, while TIR off of the top surface 106 and a bottom surface 107 of the substrate 102 offers the most efficient design with the least cost, one could alternatively have TIR on the top surface 106 and use mirrors or a reflective coating on the bottom surface 107 to reflect the light beam 104. Similarly, a cladding layer could be used below the bottom surface 107.

The HOE 100 is formed of individual diffracting members 108, of arbitrary shape, disposed directly on the top surface 106. The members 108 could consist of arbitrarily shaped dots, curved or straight strips or other shapes forming a diffracting pattern that performs a desired modification of an incident light signal. Examples of such patterns are patterns that form diffraction gratings or mirrors of arbitrary curvature. If the members 108 were dots in an arrayed pattern, the HOE 100 could be made to function as a beam splitter receiving the input 104 and reflecting portions of the input into any number of output directions. Such dots could have circular, oval, cross, or square shapes, and the HOE 100 pattern formed of the members 108 could create a 1×2 or 1×N splitter depending on the spacing between the dots.

In the illustrated embodiment, the members 108 are formed of an optically transparent material. These members 108 create a HOE performing the function of a tilted mirror. The geometry of the members 108 will affect the properties and operation of the HOE 100. The embodiment of FIG. 1 shows the members to be strips 108 formed in direct physical contact with the top surface 106, though these strips 108 could be disposed slightly above the top surface 106, as well (see, FIG. 8).

Figure 2:
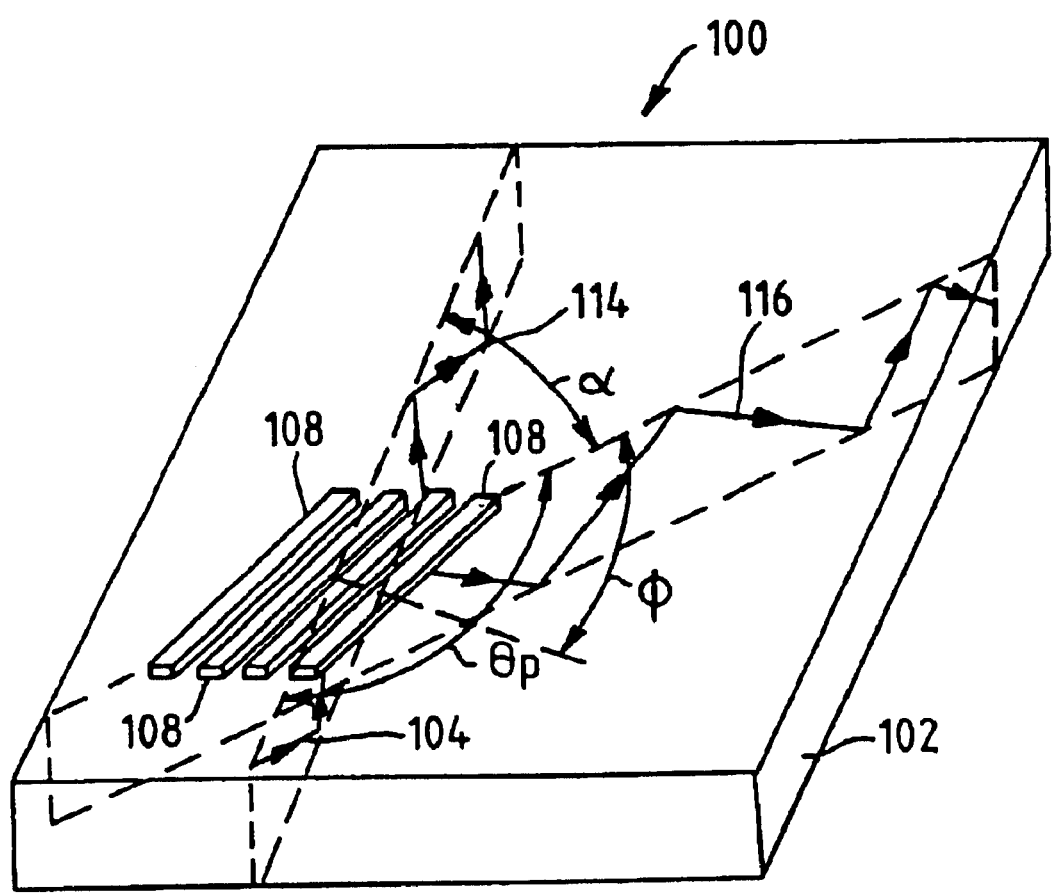
FIG. 2 is a perspective view of the holographic optical element of FIG. 1 showing the direction of a reflected light beam.

The strips 108 may be formed of a single crystal silicon, poly-silicon, amorphous silicon, alumina, sapphire, silicon-nitrite, germanium silica or other optically transparent material which is also processable using a 1 or 0.5 $\mu$m microelectromechanical systems (MEMS) processing technique. The preferred material is poly-silicon since it is transparent at the desired operating frequencies, can be easily processed with MEMS processes and has a high refractive index. Only a few strips 108 are exemplarily shown, but in operation there would typically be a larger number of such strips to ensure that the light beam 104 is incident upon some part of the HOE 100. Further, the strips 108 are shown in cross-section and actually would extend into and out of the illustration, as depicted in FIG. 2.

The strips 108 have a width 'b' and are spaced apart on the top surface 106 a distance 'c'. Grating period 'a' is equal to the sum of these two values. The HOE 100 reflects incident light 104 into light beam 116, and the width 'a' affects the wavelength of light the HOE 100 is optimized to reflect. In the preferred embodiment, the width 'b' is equal to width 'c', yet the widths may be non-equal, if so desired. Strip thickness and width can be adjusted to maximize the intensity of the reflected light. Additionally, there could be intra-width variation, wherein the width 'b' could vary (e.g., b1, b2, b3, etc.) and the width 'c' could vary (e.g., c1, c2, c3, etc.). For example, a HOE could be formed with different 'a' values (a1, a2, a3, etc.) where 'a' varies continuously, such that a1>a2>a3> etc. An exemplary apparatus could be used to reduce dispersion in the reflected signal or to increase the amount of dispersion therein, as might be useful in demultiplexing applications. As the strips 108 form a grating pattern, exact dimensional precision is not necessary to produce a functioning device. The aggregate affect of the strips 108, and spacings therebetween, is to minimize inexactness in the sizing of any particular strip 108. It is preferred, nonetheless, that the HOE 100 have 'a' periodicity, i.e., that 'a' is substantially the same throughout the HOE 100. In this way, 'a' is more influential on HOE 100 operation than 'b' or 'c'. In an exemplary structure, width 'a' would be on the order of 1.5 $\mu$m, i.e., on the order of the wavelength of incident light, which is about 0.9 $\mu$m for the C band in a sapphire substrate.

The strips 108 are shown in cross-section and extend out of the illustrations. The strips 108 extend in parallel planes that are each at an acute angle to the plane of the propagation of the light 104, i.e., the plane of the illustration. This can be seen from FIG. 2. The strips 108 are linear and parallel in the preferred embodiment, but non-linear strips may be used. For example, curved strips may be used to create a HOE that acts as a focusing mirror. Furthermore, the strips 108 are oriented perpendicularly to a line-bisecting angle $\theta_p$, shown in FIG. 2.

In operation, the strips 108 cooperate with the top surface 106 to define a diffraction grating pattern or tilted mirror. The incident light 104 hits the pattern and is reflected, as shown and described below. Thus, the HOE 100 acts as a reflective element.

At the top of the substrate 102, the spacings 'c' between the strips 108 together form a interface layer 110, which is an air-substrate interface layer. As the light beam 104 is traveling in the substrate 102 under total internal reflection, a portion of the light beam 104 is diffracted at the interface layer 110 under total internal reflection. That is, a first portion of the light beam 104 is incident upon the air-substrate interface layer 110 and is diffracted by the reflective action of the spaces between the strips 108. Since these spaces are on the order of the wavelength of the incident light, diffraction occurs rather than plane-wave reflection. A second portion of the light beam 104 incident upon the HOE 100 is incident upon that portion of the top surface 106 below the strips 108. Here, the strips 108 will absorb light energy from the substrate and act like low loss waveguide resonators bounded on a top surface 112 and side surfaces by a lower index of refraction material—air in the preferred embodiment. Thus, there is TIR reflection within the strips 108 as well as the TIR propagation within the substrate 102. A standing wave is essentially created in the strips 108, and absorbed light will eventually leave the strips 108 and reenter the substrate 102 phase shifted from the light reflected by the interface layer 110. If the strips 108 have a higher index of refraction than the substrate 102, efficiency is further improved since the standing waves also are bounded by a lower surface with a transition to a lower index of refraction. The effect of the strips 108 and the interface layer 110 is to collectively diffract the light beam 104 into a m=−1 mode that propagates within the substrate 102. Light beam 116 represents this reflected signal, while path 114 is the path light beam 104 would travel within the substrate 102 if unaffected by strips 108. Path 114 could also coincide with the m=0 mode of the HOE diffraction pattern where destructive interference has minimized the output.

FIG. 2 shows the propagation of the reflected light beam 116. The propagation path 116 travels in a plane that is at an angle, $\alpha$ or $\theta_p$, to the plane of propagation of the light beam 104. Thus, propagation path 116 travels in a plane extending out of the illustration of FIG. 1. Having the reflected light beam 116 travel in a second direction of propagation allows the HOE 100 to spatially separate out the reflected signal path from the signal path of the incident propagating beam and, therefore, suggests the use of the HOE 100 as a way of switching an output. For example, if a beam is made to propagate under TIR in a direction incident upon the HOE 100 the beam will be switched, whereas if the beam is made to propagate along another path not incident upon the HOE 100 it will propagate along its original propagation path.

Figure 3:
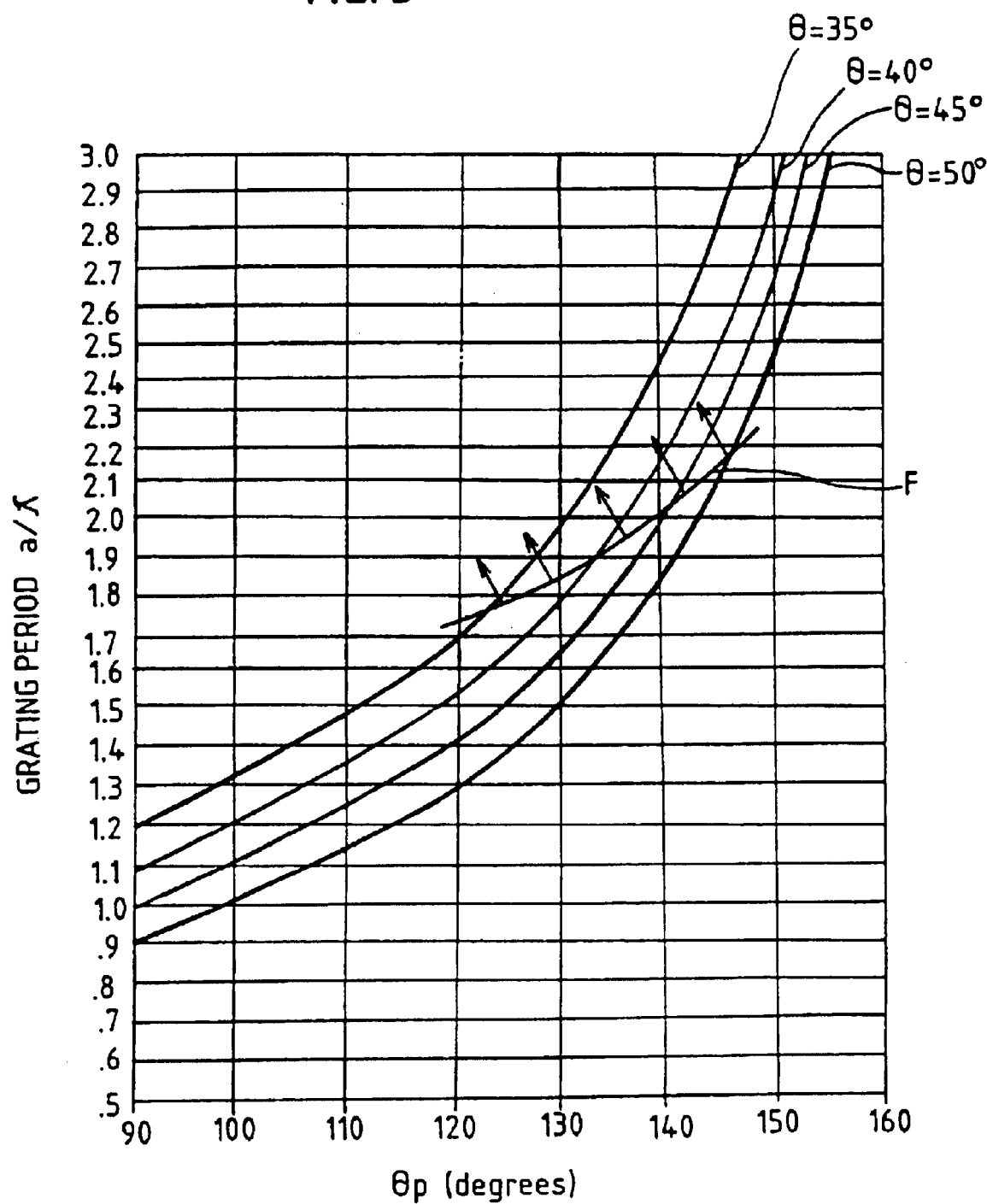
FIG. 3 is a graph of angle $\theta_p$ versus grating period over wavelength for an exemplary HOE.

The angle of reflection, $\theta_p$, created by the HOE 100 depends on numerous factors, including the strip periodicity 'a', the angle of incidence $\theta$, and the wavelength of the light $\lambda$. A sample graph showing the relationship between $\theta_p$ and these variables is shown in FIG. 3. FIG. 3 plots angle $\theta_p$ on the x-axis and 'a'/$\lambda$ on the y-axis for various angles of incidence $\theta$. FIG. 3 assumes that the angle of incidence $\theta$ is the same before and after interaction of the light with the HOE such that TIR in the substrate is maintained. As can be seen, for θ=35°, 'a'/λ of 1.5 will result in $\theta_p$ of approximately 110°. Similarly, with θ=45° an 'a'/λ of 1.5 will result in θ of approximately 125°. The graph also shows that, in this example, θ can range from about 90° to about 145° depending on the parameters. The graph also shows exemplary ranges on 'a', though 'a' ranges generally extend from approximately 0.5λ to 4λ depending on parameters. The graph of FIG. 3 also shows a forbidden region, extending above a line F, within which light is reflected into more modes than just the m=−1 mode.

Returning to FIG. 2, another apparent feature of the HOE 100 is that light path 116 travels within the substrate 102 under total internal reflection. This is desirable to reduce losses on the reflected signal. The reflection into a totally internally reflected path is achieved by adjusting the grating periodicity 'a'.

The strips 108 are disposed to couple a portion of the light beam 104 traveling in the substrate 102 by being placed in direct contact with top surface 106 of the substrate 102. The present disclosure, however, is not limited to the illustrated embodiment. Instead, an HOE may be disposed entirely above the top surface 106 and still be coupled to light traveling within the substrate 102. As is known, light reflected at a boundary interface under total internal reflection produces an evanescent field extending above the boundary interface. An HOE may be coupled to this evanescent field, i.e., without the strips in direct physical contact with the substrate, and still affect the light traveling within the substrate. Frustrated total internal reflection operates on this principle. Such an alternative is described below with respect to FIG. 10.

Figure 4:
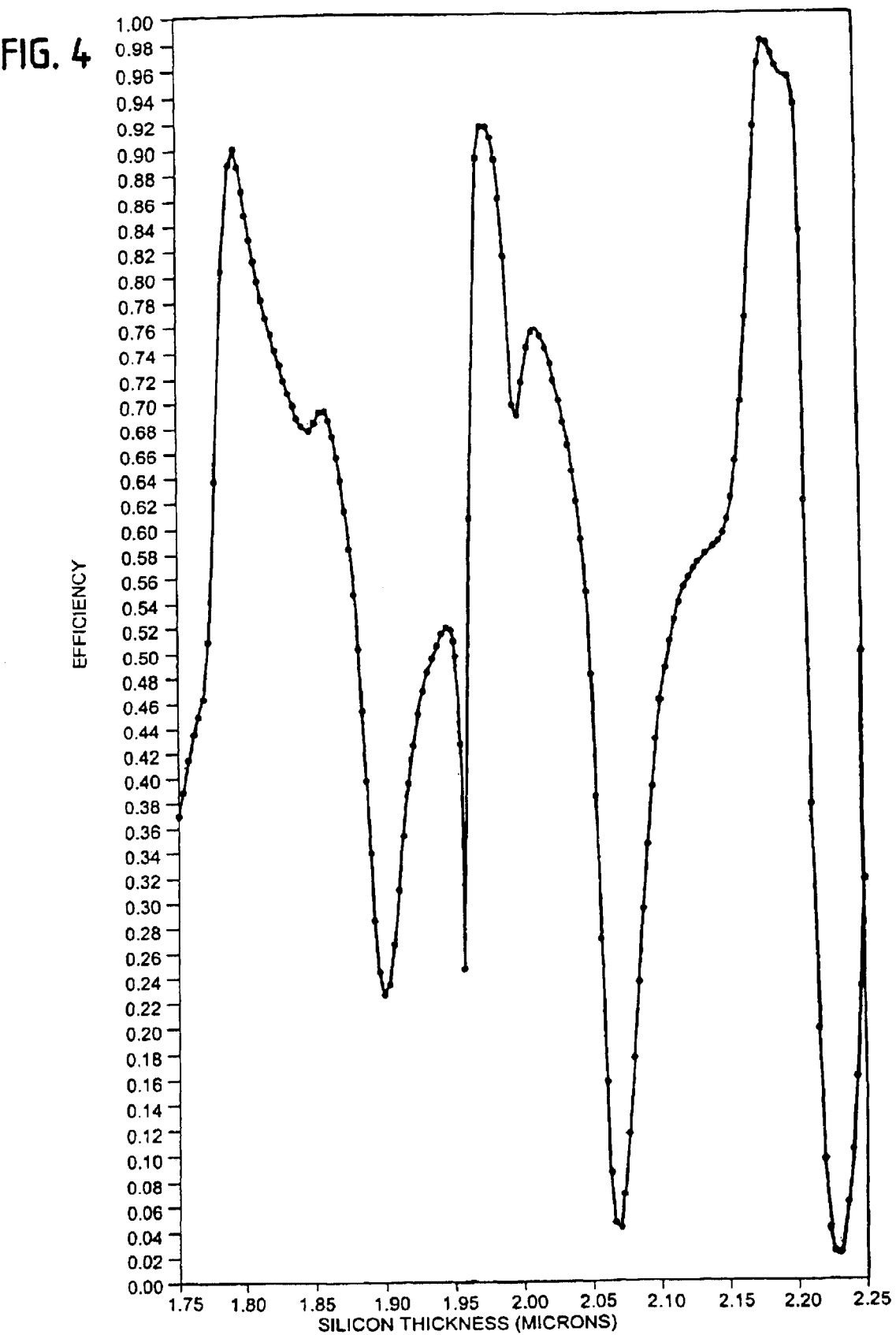
FIG. 4 is a graph of the HOE strip thickness versus HOE efficiency for an exemplary HOE.

Strip thickness establishes a phase shift between the light diffracted from the interface layer 110 and the light from the resonator strips 108. In the preferred embodiment, the thicknesses for all strips 108 are identical. Furthermore, the thickness is chosen to maximize the amount of the incident light 104 reflected into light path 116. A graph showing HOE efficiency versus silicon strip thickness is shown in FIG. 4. In this exemplary graph, the substrate is made of sapphire, the incident beam is TE polarized, 'a'=1.5 μm, λ=1.55 μm, θ=45°, and φ=65.3°. As is shown, there are numerous strip thickness which produce very high efficiency. Efficiency peaks occur at approximately 1.55 μm, 1.84 μm, and 2.15 μm. This graph is merely representative, however, and lower thicknesses may be used. For example, as the thickness of the strips 108 is to be chosen to impart the appropriate phase shift on the absorbed light, multiple harmonics of a particular thickness would impart the same phase shift, and therefore, could be used. Preferred thickness for strips consisting of poly-silicon fabricated with MEMS processes are 0.5 μm to 3 μm.

An additional advantage of the HOE 100 is that strip thickness allows structures to be formed that are substantially independent of the polarization state of the incident light beam. This performance feature is known as polarization dependent loss, a design requirement set-forth by the industry Telecordia standard GR1073. We have found that for any incident linear polarization state HOE efficiencies over 90% are theoretically achievable.

To form the strips 108, a process of depositing a film of poly-silicon, or other material, on the sapphire substrate 102 can be used. Alternatively, a single crystal silicon can be epitaxially grown on the sapphire substrate 102. In either case, with the poly-silicon layer or the single crystal silicon layer formed on the top surface 106, standard 1 μm or 0.5 μm MEMS photolithography techniques can be employed to form the desired grating pattern in a photoresist layer and the pattern can be etched into the silicon using standard MEMS etching techniques similar to the commercially available multi-user MEMS process (MUMPs™). The sapphire substrate 102 provides an etch stop so that the height of the strips can be accurately controlled.

Figure 5:
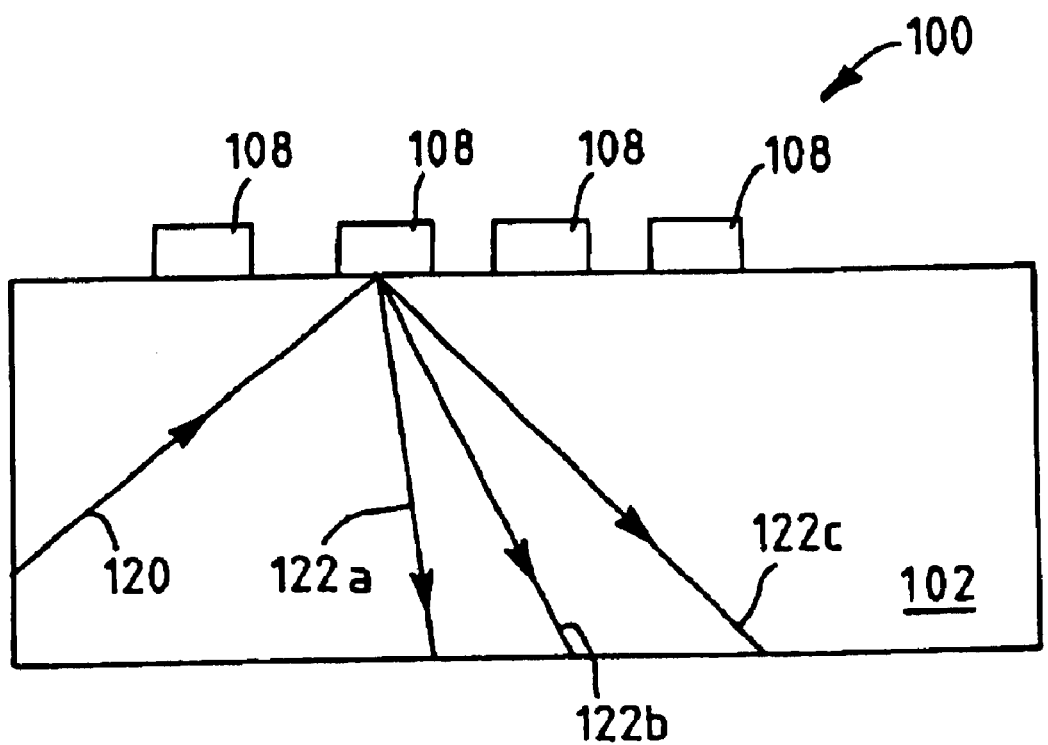
FIG. 5 is a side view of the holographic optical element of FIG. 1 used as a demultiplexer to separate out an input signal into various constituent wavelengths.

The HOE 100 and integrated substrate 102 can be used in various applications to perform various optical functions. One is exemplified in FIG. 5 where the HOE 100 acts as a demultiplexer. HOEs are wavelength dependent in operation. Thus, if the input light beam 120 contains light of more than one wavelength, such as beams carrying multiple channels in a dense wavelength division multiplexed (DWDM) systems, the different wavelengths will be diffracted by the HOE 100 at different angles. This phenomenon can be used to separate out the different wavelengths of the input light beam 120 into different components, exemplarily shown as propagation paths 122a, 122b, and 122c. Each of the different propagation paths 122a–c would be in a separate plane where each plane would be at a different angle to the plane of the propagation path 104. The propagation paths 122a–c, nonetheless, would all preferably travel in the substrate 102 under substantially total internal reflection. The HOE 100 can be made to operate as a demultiplexer by coupling the various propagation paths 122a–c into different output fibers, for example. The HOE 100 shown in FIG. 5 could also be used as a wavelength filter by routing only a desired propagation path to an output fiber. Thus, an integrated substrate and diffractive optical element, here in the form of the HOE 100, can reflect a signal into different reflected paths depending on wavelength.

Figure 6:
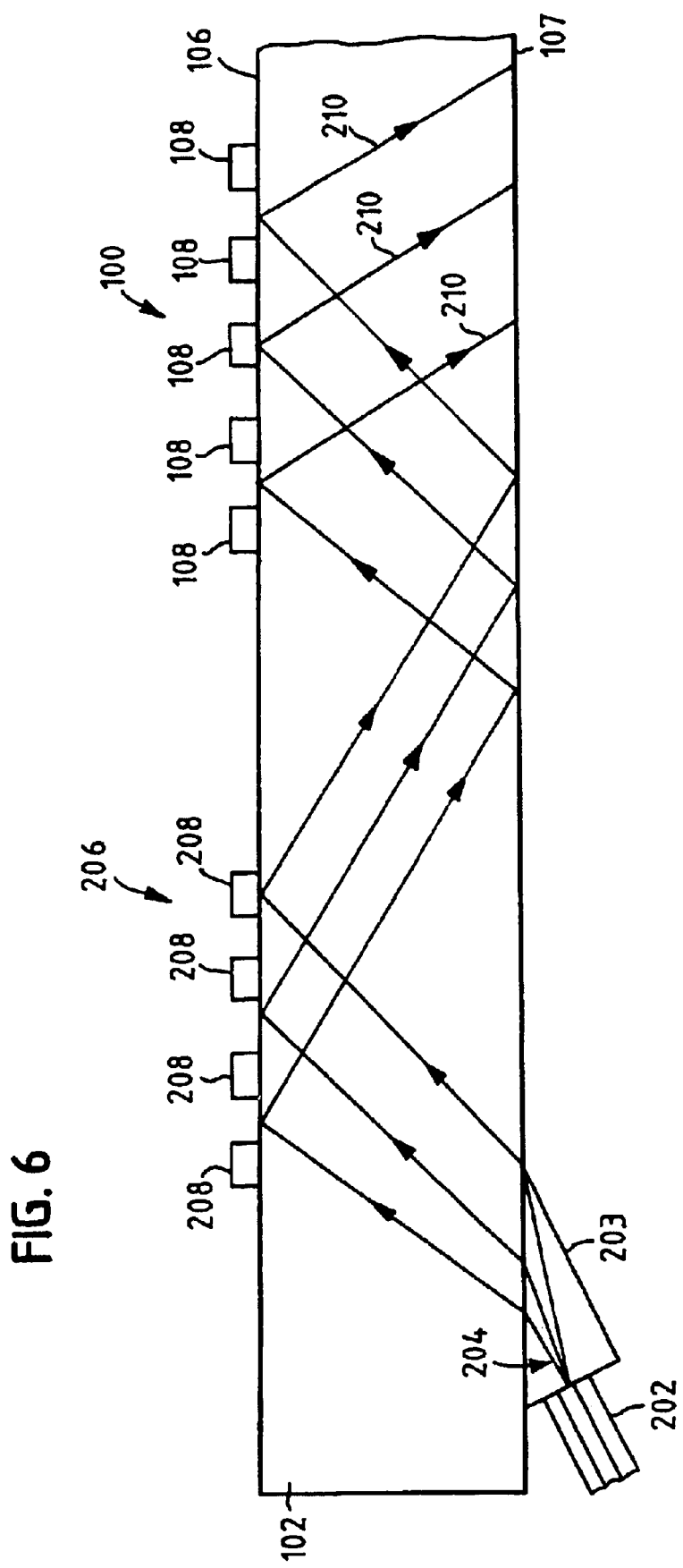
FIG. 6 is an illustration of an exemplary structure for coupling an optical signal into a substrate for traveling therein under total internal reflection.

There are numerous ways to couple light signals into the substrate 102 for establishing TIR propagation. For example, sufficient methods include cleaving an input fiber, cleaving an edge of the substrate, providing a cleaved element between the optical fiber and the substrate, or some combination of these. FIG. 6 shows an exemplary way of coupling light into a substrate. Here, an optical fiber 202 is coupled to the substrate 102 via refractive element 203. The optical fiber 202 couples a diverging incident light beam 204 into the refractive element 203, formed of an optically transparent material with an index of refraction lower than that of the substrate 102. The refractive element 203 refracts the light 204 for TIR propagation in the substrate 102. The light beam 204 impinges on a focusing element 206, which in an embodiment is a HOE formed on the top surface 106 to collimate the spreading light beam 204 and to reflect it for travel under TIR within the substrate 102. The focusing element 206 can be any suitable HOE structure or may be formed according to the HOE 100, described above. Forming the focusing element 206 like that of the HOE 100 has the advantage of making device fabrication easier. The focusing element 206 has members 208, like members 108 of FIG. 1. Other than the focusing element 206 coupling light from the fiber 202, the structure in FIG. 6 is the same as that of FIG. 1. Thus, FIG. 6 shows another optical device that can be created using an integrated substrate and diffractive optical element, a beam collimator in the form of the HOE 206.

FIG. 6 also shows that multiple diffractive optical elements may be combined on a single substrate, and therefore integrated therewith, to form complex structures. The use of many diffractive optical elements performing similar or dissimilar optical functions allows for the creation of an integrated optical circuit using the disclosed devices and techniques. In the particular example, the focusing element 206 sends the collimated incident light 204 to the HOE 100 also formed on the same side of the substrate. The two-element structure, therefore, allows for both coupling and reflecting of the input signal. Reflected signal path 210 (having properties like that of path 116) is shown in FIG. 6. Other modifications to the depicted structure could exist, such as having the HOE 100 formed of curved strips that function both as a reflecting element and a converging or diverging lens or mirror. Adding multiple diffractive optical elements together has the advantage of allowing for the creation of integrated optical circuits and such integrated optical circuits could be more easily manufactured. Integrated optical circuits of reflectors, beam splitters, collimators, variable attenuators, diffraction gratings etc. may be designed. Furthermore, the ability to form, for example, the HOE 100 and the focusing element 206 on the same surface of the substrate 102 using a single photolithography process means not only easier device fabrication, but the alignment problems plaguing existing integrated optical circuit devices will be avoided as the desired alignment will be created through the photolithography development process.

Figure 7:
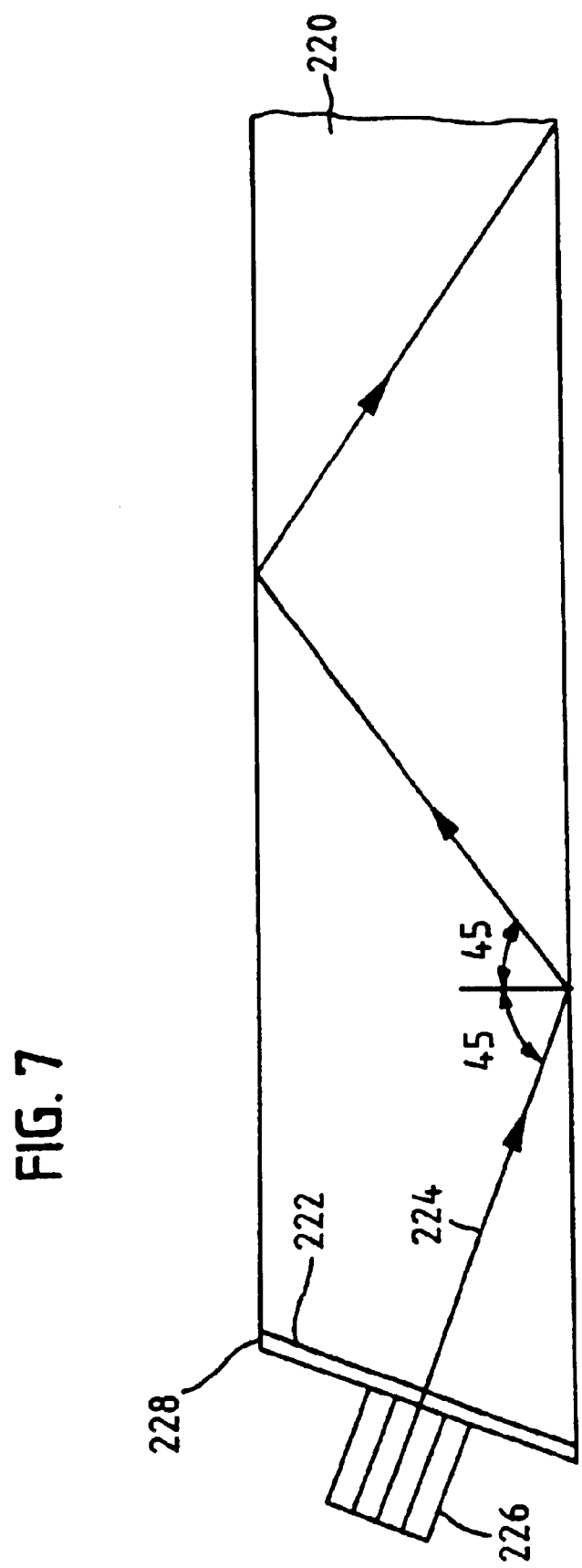
FIG. 7 is a side view of an alternative way of coupling light into the substrate for total internal reflection.

FIG. 7 shows a coupling alternative to FIG. 6 that does not use a collimating element like 206. Here, a substrate 220 has a cleaved side surface 222, which acts as a prism for incoming signals. At a 45° cut, the surface 222 will receive light signal 224 from a collimating graded index lens (GRIN) 226 for TIR within the substrate 220. The GRIN lens 226 may be coupled directly to a refractive element or a thin layer of anti-reflecting coating 228 that minimizes reflection losses.

Figure 8:
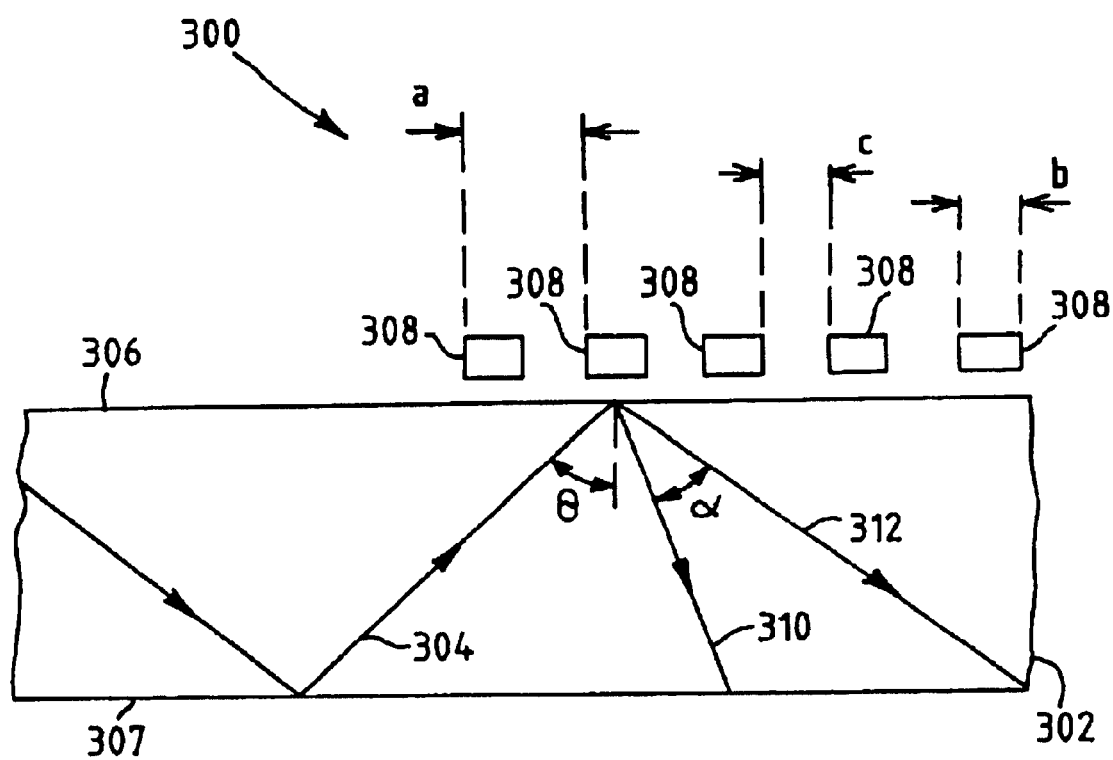
FIG. 8 is a cross-sectional view of an alternative HOE in which strips forming the HOE are disposed above the optical substrate.

FIG. 8 shows an alternative HOE to those previously described. Whereas FIG. 1 shows a HOE in physical contact with a substrate, FIG. 8 shows an HOE 300 is deposed above (i.e., out of physical contact with) a substrate 302, in which light 304 passes through the substrate 302. Light beam 304 propagates within the substrate 302 under TIR. TIR propagation in the substrate 302 may be achieved from the coupling of light into the substrate, as discussed above. Furthermore, as with FIG. 1, TIR need only be established on a top surface 306 of the substrate 302 with mirrors or a reflective layer on a bottom surface 307 of the substrate, though preferably TIR would occur at both surfaces 306, 307.

The HOE 500 is formed of strips 308 positioned above the top surface 306 of the substrate 302. The strips 308 cooperate with the substrate 302 like strips 108 in HOE 100, the difference being in FIG. 8 that the strips 308 need not be in direct physical contact with the top surface 306, but rather are in coupling contact with the substrate 302 through an evanescent field extending above the top surface 306 and created by the TIR propagation. In operation, a first portion of light beam 304 will be diffracted from the top surface 306 and a second portion will be coupled into the strips 308, such that the output from the strips 308 will cooperate with the reflected first portion to form a m=−1 order mode coinciding with reflected path 310. The unaffected reflection path, i.e., the m=0 mode is shown in 312. This condition may be thought of as frustrated total internal reflection. The reflected beam along path 310, in the preferred embodiment, will be made to reflect at an angle α (or $\theta_p$) to the direction of propagation of the incident beam 304 and within the substrate under TIR, as with the HOEs previously described. The HOE 300 may be formed similarly to that of HOE 100, except a sacrificial layer or spacer layer would be deposited on the substrate 302, in an initial step. After the depositing and photolithography steps described above, the sacrificial layer would be dissolved away or removed as a final processing step leaving the strips 308 within evanescent coupling distance to the substrate. To support the strips 308, standard anchoring portions would also be formed using MEMS processing.

Many additional changes and modifications could be made to the invention without departing from the fair scope and spirit thereof. The scope of some changes is discussed above. The scope of others will be come apparent from the appended claims.

We claim:

1. An integrated optical device comprising:
   an optical substrate defining a non-guiding propagation region for an incident light signal propagating in a primary direction of propagation under total internal reflection at a surface of the substrate; and
   a diffractive optical element having a plurality of spaced-apart members formed of an optically transparent material and disposed above the top surface of the substrate such that the incident light signal incident on the surface under total internal reflection is reflected into the non-guiding propagation region along a desired direction of propagation different than the primary direction of propagation.

2. The integrated optical device of claim 1, wherein the substrate is formed of quartz.

3. The integrated optical device of claim 1, wherein the substrate is formed of sapphire.

4. The integrated optical device of claim 1, wherein the members are a plurality of strips that are substantially parallel.

5. The integrated optical device of claim 4, wherein the plurality of strips each have a substantially identical strip width.

6. The integrated optical device of claim 4, wherein the plurality of strips are each spaced apart a substantially equal spacing distance.

7. The integrated optical device of claim 4, wherein the plurality of strips each have a substantially identical strip width, the plurality of strips are each spaced apart a substantially equal spacing distance, and the spacing distance is substantially identical to the strip width.

8. The integrated optical device of claim 7, wherein the sum of the distance and width is between 0.5λ and 4λ, where λ is the wavelength of the light signal in the substrate.

9. The integrated optical device of claim 1, wherein the thickness of the members is adjusted to maximize the intensity of the reflected light signal.

10. The integrated optical device of claim 1, wherein the members are formed of a material selected from the grouping consisting of amorphous silicon, crystalline silicon, and poly-silicon.

11. The integrated optical device of claim 1, wherein the members are formed of a material selected from the grouping consisting of alumina, sapphire, silicon nitride, and an alloy of poly-silicon and poly-germanium.

12. The integrated optical device of claim 1, wherein the incident light signal propagates as a first unguided wave within the substrate, wherein the diffractive optical element is disposed to reflect the incident light signal as a second unguided wave within the substrate, and wherein the members are disposed in direct contact with the surface of the substrate.

13. The integrated optical device of claim 1, wherein the diffractive optical element produces a first order diffracted mode that travels within the substrate in the desired direction of propagation at an angle to the primary direction of propagation.

14. The integrated optical device of claim 13, wherein the first order diffracted mode travels within the substrate under total internal reflection.

15. The integrated optical device of claim 1, wherein the light beam is coupled into the substrate through a GRIN lens.

16. The integrated optical device of claim 1, wherein the members are substantially parallel linear elements.

17. The integrated optical device of claim 1, wherein the members are formed on the surface of the substrate by depositing a silicon material in a patterned form.

18. The integrated optical device of claim 1, wherein the members and the substrate are formed of the same material.

19. The integrated optical device of claim 18, wherein the material is sapphire.

20. The integrated optical device of claim 1, where the members have a higher index of refraction than that of the substrate.

21. The integrated optical device of claim 1, where the diffractive optical element operates by means of total internal reflection.

22. The integrated optical device of claim 1, comprising a plurality of incident light signals propagating within the substrate each having a different wavelength and wherein the diffractive optical element reflects each of the plurality of incident light signals into a different first order diffracted mode as a reflected light signal that travels within the substrate in one of plurality of second directions of propagation each at an angle to the primary direction of propagation, each reflected light signal traveling within the substrate under total internal reflection.

23. The integrated optical device of claim 1, wherein the members each have a width selected to maximize the intensity of the reflected light signal.

24. The integrated optical device of claim 1, wherein the members are formed of a plurality of strips, each strip having a width and an associated spacing, wherein the widths and the spacings vary among the strips.

25. The integrated optical device of claim 24, wherein the widths and the spacings vary in a continuous manner.

26. A diffraction grating for use with an optically transparent substrate, the diffraction grating comprising:

a plurality of members formed of an optically transparent material and disposed above a surface of the substrate, the members being spaced apart a spacing distance and having member widths, whereby the sum, a, of the spacing distance and the member width is chosen such that a light signal traveling within the substrate under total internal reflection off the surface in an incident direction of propagation and incident upon the diffraction grating is reflected into a first diffracted order propagating within the substrate in a reflected direction of propagation defining an angle, $\theta_p$, with respect to the incident direction of propagation and propagating within the substrate under total internal reflection, wherein the light signal is incident upon the diffraction grating at an angle, $\theta$, above a critical angle, $\theta$ being measured from a normal to the surface of the substrate extending into the substrate, and wherein the sum a is chosen such that $\theta_p$ is greater than 90° and less than 180°.

27. The diffraction grating of claim 26, wherein the sum, a, is between $0.5\lambda$ and $4\lambda$, where $\lambda$ is the wavelength of the light signal within the substrate.

28. The diffraction grating of claim 27, wherein $\lambda$ is between 0.25 $\mu$m microns and 10 $\mu$m microns.

29. The diffraction grating of claim 26, wherein the spacing distance is substantially identical to the member width.

30. The diffraction grating of claim 26, wherein the members are formed of a material selected from the grouping consisting of amorphous silicon, crystalline silicon, and poly-silicon and wherein the substrate is formed of sapphire.

31. The diffraction grating of claim 26, wherein the members have an index of refraction higher than the index of refraction of the substrate.

32. An integrated optical device comprising:

an optical substrate disposed to propagate an incident light signal, in a primary direction of propagation, under total internal reflection at a surface of the substrate; and a diffractive optical element having a plurality of spaced-apart members formed of an optically transparent material and disposed above the top surface of the substrate such that the incident light signal incident on the surface under total internal reflection is reflected within the substrate along a desired direction of propagation different than the primary direction of propagation, wherein the plurality of spaced-apart members are disposed in evanescent field coupling contact with the surface of the substrate.

* * * * *

UNITED STATES PATENT AND TRADEMARK OFFICE
CERTIFICATE OF CORRECTION

PATENT NO. : 6,810,176 B2
DATED : October 26, 2004
INVENTOR(S) : Frick et al.

It is certified that error appears in the above-identified patent and that said Letters Patent is hereby corrected as shown below:

Column 10,
Line 14, please insert -- within a first plane and -- after "propagating".
Line 19, please delete "disposed above" and insert -- externally mounted to --.
Lines 22-24, please delete "along a desired direction of propagation different than the primary direction of propagation." and insert -- for propagation within a second plane forming an acute angle with the first plane, wherein the first plane and the second plane extend orthogonally to the surface. --.
Line 46, please delete "adjusted" and insert -- set --.
Lines 65-67, please delete "desired direction of propagation at an angle to the primary direction of propagation." and insert -- second plane. --.

Column 11,
Line 5, please delete "beam" and insert -- signal --.
Line 24, please insert -- and within the first plane -- after "substrate".
Line 28, please delete "in" and insert -- into --.
Lines 28-30, please delete "plurality of second directions of propagation each at an angle to the primary direction of propagation," and insert -- a plurality of reflection planes forming an acute angle with the first plane and each reflection plane perpendicular to the surface, --.
Line 38, please delete "top".

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,810,176 B2
DATED : October 26, 2004
INVENTOR(S) : Frick et al.

It is certified that error appears in the above-identified patent and that said Letters Patent is hereby corrected as shown below:

Column 10,
Line 14, insert -- within a first plane and -- after "propagating".
Line 19, delete "disposed above" and insert -- externally mounted to --.
Lines 22-24, delete "along a desired direction of propagation different than the primary direction of propagation." and insert -- for propagation within a second plane forming an acute angle with the first plane, wherein the first plane and the second plane extend orthogonally to the surface. --.
Line 46, delete "adjusted" and insert -- set --.
Lines 65-67, delete "desired direction of propagation at an angle to the primary direction of propagation." and insert -- second plane. --.

Column 11,
Line 5, delete "beam" and insert -- signal --.
Line 24, insert -- and within the first plane -- after "substrate".
Line 28, delete "in" and insert -- into --.
Lines 28-30, delete "plurality of second directions of propagation each at an angle to the primary direction of propagation," and insert -- a plurality of reflection planes forming an acute angle with the first plane and each reflection plane perpendicular to the surface, --.

Column 12,
Line 38, delete "top".

This certificate supersedes Certificate of Correction issued August 23, 2005.

Signed and Sealed this

Twenty-seventh Day of December, 2005

JON W. DUDAS
*Director of the United States Patent and Trademark Office*